(12) United States Patent
Babazadeh et al.

(10) Patent No.: US 10,439,500 B2
(45) Date of Patent: Oct. 8, 2019

(54) CONTROL OF ISOLATED POWER CONVERTERS DURING TRANSIENT LOAD CONDITIONS

(71) Applicant: Infineon Technologies Austria AG, Villach (AT)

(72) Inventors: Amir Babazadeh, Laguna Hills, CA (US); Darryl Tschirhart, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/421,931

(22) Filed: Feb. 1, 2017

(65) Prior Publication Data

US 2018/0219485 A1    Aug. 2, 2018

(51) Int. Cl.
*H02M 3/335* (2006.01)
*H02J 3/18* (2006.01)
(Continued)

(52) U.S. Cl.
CPC ......... *H02M 3/33546* (2013.01); *H02M 1/32* (2013.01); *H02M 1/40* (2013.01); *H02M 3/3376* (2013.01); *H02M 2003/1566* (2013.01)

(58) Field of Classification Search
CPC ......... H02M 3/33538; H02M 3/33546; H02M 3/33553; H02M 3/33561; H02M 3/33569;
(Continued)

(56) References Cited

U.S. PATENT DOCUMENTS

| 5,081,570 A | 1/1992 | Chibani et al. |
| 5,978,238 A | 11/1999 | Liu |

(Continued)

FOREIGN PATENT DOCUMENTS

| CN | 101005242 A | 7/2007 |
| CN | 201219239 Y | 4/2009 |

(Continued)

OTHER PUBLICATIONS

Hwa-Pyeong Park et al. "Design Considerations of Resonant Network and Transformer Magnetics for High Frequency LLC Resonant Converter", Journal of Electrical Engineering and Technology, vol. 11, Issue 2, pp. 383-392, Nov. 2, 2016.*

(Continued)

*Primary Examiner* — Jeffrey A Gblende
*Assistant Examiner* — Sisay G Tiku
(74) *Attorney, Agent, or Firm* — Murphy, Bilak & Homiller, PLLC (57) ABSTRACT

An isolated power converter includes primary side switch devices coupled to secondary side rectifying devices by a transformer and a controller. Responsive to a transient load condition, the controller switches the primary side switch devices at an initial switching period having a positive half cycle and a negative half cycle to transfer energy across the transformer during the positive half cycle and the negative half cycle. The positive half cycle and the negative half cycle of the initial switching period have the same initial duration. The controller is further operable to symmetrically reduce the duration of the positive half cycle and the negative half cycle for at least one subsequent switching period during the transient load condition.

27 Claims, 7 Drawing Sheets

(51) Int. Cl.
*H02M 1/32* (2007.01)
*H02M 3/337* (2006.01)
*H02M 1/40* (2007.01)
H02M 3/156 (2006.01)

(58) Field of Classification Search
CPC .. H02M 3/33592; H02M 7/217; H02M 7/219;
H02M 7/53; H02M 7/537; H02M 7/538;
H02M 7/42; H02M 7/44; H02M 7/48;
H02M 7/53803; H02M 7/53846; H02M
7/538466; H02M 7/53873; H02M 7/539;
H02M 7/5395; H02J 3/18
See application file for complete search history.

(56) References Cited

U.S. PATENT DOCUMENTS

| | | | | |
|---|---|---|---|---|
| 6,191,964 | B1* | 2/2001 | Boylan | H02J 1/102 |
| | | | | 323/239 |
| 7,880,577 | B1* | 2/2011 | Glaser | H02M 3/335 |
| | | | | 323/308 |
| 8,416,597 | B2* | 4/2013 | Adragna | H02M 3/33592 |
| | | | | 363/127 |
| 8,456,867 | B1 | 6/2013 | Karlsson et al. | |
| 8,976,543 | B1* | 3/2015 | Zheng | H02M 1/38 |
| | | | | 363/17 |
| 9,083,255 | B2* | 7/2015 | Duan | H02M 3/33592 |
| 9,166,481 | B1* | 10/2015 | Vinciarelli | H02M 3/33569 |
| 9,252,672 | B2* | 2/2016 | Wu | H02M 3/33507 |
| 9,379,628 | B2* | 6/2016 | Zambetti | H02M 3/33546 |
| 9,680,386 | B2* | 6/2017 | Xie | H02M 3/33592 |
| 9,825,546 | B2* | 11/2017 | Tang | H02M 3/33546 |
| 2005/0105237 | A1* | 5/2005 | D'Amato | H02M 3/33538 |
| | | | | 361/118 |
| 2009/0279331 | A1 | 11/2009 | Young et al. | |
| 2011/0157927 | A1* | 6/2011 | Adragna | H02M 3/3376 |
| | | | | 363/26 |
| 2011/0194206 | A1* | 8/2011 | Sase | H02M 3/33592 |
| | | | | 360/75 |
| 2011/0299304 | A1 | 12/2011 | Coley et al. | |
| 2013/0308344 | A1* | 11/2013 | Rosado | H02M 3/33584 |
| | | | | 363/17 |
| 2014/0043860 | A1 | 2/2014 | Luh et al. | |
| 2014/0185328 | A1 | 7/2014 | Rosado et al. | |
| 2014/0192560 | A1 | 7/2014 | Ou et al. | |
| 2014/0218973 | A1 | 8/2014 | Popovici et al. | |
| 2015/0003116 | A1 | 1/2015 | Karlsson et al. | |
| 2015/0103565 | A1 | 4/2015 | Shimamori et al. | |
| 2015/0333634 | A1 | 11/2015 | Yoshida et al. | |
| 2015/0365005 | A1 | 12/2015 | Panov et al. | |
| 2016/0079878 | A1* | 3/2016 | Lin | H02M 3/33592 |
| | | | | 363/21.14 |
| 2016/0094134 | A1 | 3/2016 | Iyasu et al. | |
| 2016/0285377 | A1 | 9/2016 | Takagi et al. | |
| 2016/0372927 | A1* | 12/2016 | Dent | H01L 31/0504 |
| 2017/0025962 | A1* | 1/2017 | Davidson | H02M 1/44 |
| 2017/0063251 | A1* | 3/2017 | Ye | H02M 3/33576 |
| 2017/0163159 | A1* | 6/2017 | Tschirhart | H02M 3/33507 |

FOREIGN PATENT DOCUMENTS

| | | |
|---|---|---|
| CN | 101677212 A | 3/2010 |
| CN | 101689811 A | 3/2010 |
| CN | 102570782 A | 7/2012 |
| CN | 104160604 A | 11/2014 |
| DE | 19634713 A1 | 3/1997 |

OTHER PUBLICATIONS

Mappus, Steve, "Current Doubler Rectifier Offers Ripple Current Cancellation", TI Application Note, System Power, SLUA 323, Sep. 2004, pp. 1-8.

Cheung, Victor Sui-Pung et al., "Capacitor Current Programming Technique for Phase-Shift DC-DC Converter", 2011 IEEE Energy Conversion Congress and Exposition (ECCE), Sep. 17-22, 2011, pp. 1251-1258.

Oggier, Germán G. et al., "Boundary Control of Full-Bridge ZVS: Natural Switching Surface for Transient and Steady-State Operation", IEEE Transactions on Industrial Electronics, vol. 61, No. 2, Feb. 2014, pp. 969-979.

Shi, Hongliang et al., "Dynamic Physical Limits of a Phase-Shifted Full Bridge Circuit for Power Supply of Magnetic Resonance Imaging Gradient Amplifiers", 41st Annual Conference of the IEEE, Industrial Electronics Society, IECON 2015, Nov. 9-12, 2015, pp. 4900-4904.

Tschirhart, Darryl et al., "Flux Limited Fast Transient Response in Isolated DC-DC Converters", U.S. Appl. No. 15/333,368, filed Oct. 15, 2016.

* cited by examiner

CONTROL OF ISOLATED POWER CONVERTERS DURING TRANSIENT LOAD CONDITIONS

TECHNICAL FIELD

The present application relates to isolated power converters and, and in particular relates to control of isolated power converters during transient load conditions.

BACKGROUND

Isolated bridge topologies such as the half-bridge (HB) or full-bridge (FB) can be paired with different rectifier configurations. The selection of rectifier configurations depends on the requirements of the design, including output voltage and current requirements. The current doubler ectifier uses a single secondary winding coupled with two inductors, while maintaining the equivalent voltage stress of a full-wave rectifier. Each inductor is energized once per positive or negative cycle of the switching period, and therefore require symmetrical pulses to balance current in both branches of the doubler. Accordingly, current doubler rectifiers are not typically used for powering systems with very dynamic load conditions, such as CPU (central processing unit) applications. Also, to obtain high efficiency, high value inductors often with lower saturation limits are conventionally used so the current imbalance during (dynamic) load transients may cause inductor saturation.

Current doubler rectifiers are beneficial in high power applications with limited load activity, such that fast dynamic response is not a primary concern. In such systems, the extra magnetic components are justifiable from an area and cost perspective. Further, with infrequent load transients, balancing the inductor currents is not a consideration. However, when used in lower power applications such as powering CPUs, handling the load transient while balancing the inductor currents is preferred to avoid saturation of one of the inductors and at the same time achieve faster transient response. One way to maintain current balance during a transient load condition is to lock the duty cycle for the primary side during each half cycle. However, the transient response becomes sluggish because the reaction time is up to one switching period. Accordingly, an improved control technique for isolated power converters during transient load conditions is needed.

SUMMARY

According to an embodiment of a method of controlling an isolated power converter, the method comprises: responsive to a transient load condition, switching primary side switch devices of the isolated power converter at an initial switching period having a positive half cycle and a negative half cycle to transfer energy across a transformer of the isolated power converter during the positive half cycle and the negative half cycle, the positive half cycle and the negative half cycle of the initial switching period having the same initial duration: and symmetrically reducing the duration of the positive half cycle and the negative half cycle for at least one subsequent switching period during the transient load condition.

According to an embodiment of an isolated power converter, the isolated power converter comprises primary side switch devices coupled to secondary side rectifying devices by a transformer and a controller. The controller is operable to: responsive to a transient load condition, switch the primary side switch devices at an initial switching period having a positive half cycle and a negative half cycle to transfer energy across the transformer during the positive half cycle and the negative half cycle, the positive half cycle and the negative half cycle of the initial switching period having the same initial duration; and symmetrically reduce the duration of the positive half cycle and the negative half cycle for at least one subsequent switching period during the transient load condition.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

The embodiments described herein provide control techniques for isolated power converters such as current doubler rectifiers and full-wave rectifiers during transient load conditions. The techniques described herein balance the currents in current doubler rectifiers during transient load conditions, so that current doubler rectifiers can be used in applications with frequent load transients such as powering CPUs. The techniques described herein also avoid transformer core saturation in isolated DC-DC voltage converters such as full-bridge converters.

During a transient load condition in which an instantaneous or near instantaneous change in load current occurs, the primary side switch devices of the isolated power converter are switched at an initial switching period having a positive half cycle and a negative half cycle to transfer energy across the transformer of the isolated power converter during the positive half cycle and the negative half cycle. The positive half cycle and the negative half cycle of the initial switching period have the same initial duration. The initial duration can be selected as a function of the magnitude of the transient load condition. In some embodiments, different initial durations are assigned to different types of transient load conditions. This way, the initial duration of the positive half cycle and the negative half cycle can be optimized based on the type of transient load condition. The duration of the positive half cycle and the negative half cycle is then symmetrically reduced for at least one subsequent switching period during the transient load condition, to balance currents in a current doubler rectifier or avoid transformer core saturation in a full-bridge converter. Nonlinear control can use current or charge information for the secondary side to adjust the switching sequence of the primary side switch devices, to handle load transients as fast as possible while simultaneously limiting current imbalance. In the case of full-bridge converters, transformer core saturation is avoided.

Various embodiments of isolated power converters and control methods for isolated power converters are provided in the following detailed description and the associated figures. The described embodiments provide particular examples for purposes of explanation, and are not intended to be limiting. Features and aspects from the example embodiments may be combined or re-arranged, except where the context does not allow this.

Figure 1:
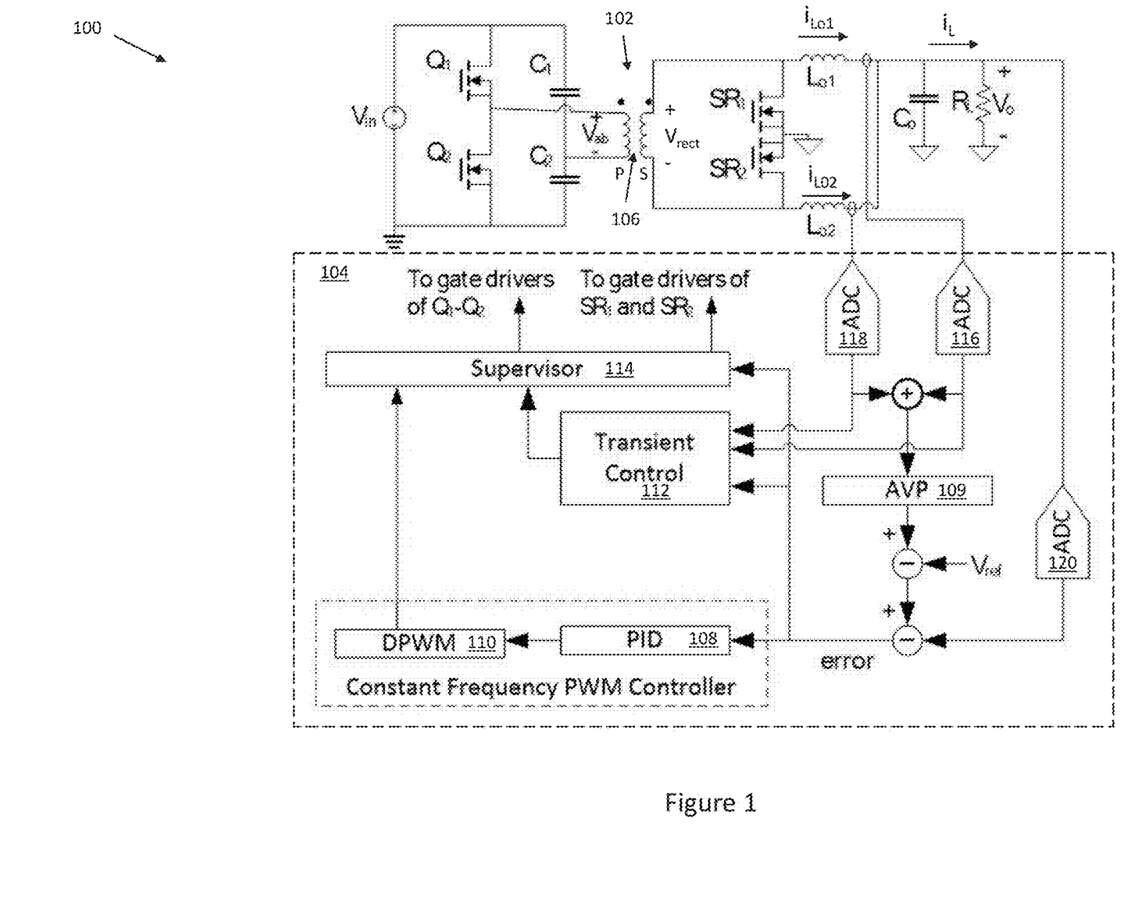
FIG. 1 illustrates a schematic diagram of a current doubler rectifier.

FIG. 1 illustrates an embodiment of an isolated power converter 100 within which the control techniques described herein may be implemented. The isolated power converter 100 has a primary side which includes primary side switch devices $Q_1$-$Q_2$ in a half bridge configuration, a secondary side which includes secondary side rectifying devices $SR_1$-$SR_2$, a transformer 102 coupling the primary side switch devices $Q_1$-$Q_2$ to the secondary side rectifying devices $SR_1$-$SR_2$, and a controller 104 for controlling operation of the converter 100. According to this embodiment, the secondary side rectifying devices $SR_1$-$SR_2$ are configured as a current doubler rectifier having two output inductor windings $L_{O1}$, $L_{O2}$ coupled to the transformer 102.

The transient response techniques described herein control switching of the primary side switch devices $Q_1$-$Q_2$, and indirectly control the secondary side rectifying devices $SR_1$-$SR_2$ as the secondary side rectifying device control signals are generated as a function of the primary side switch device control signals. The secondary side rectifying devices $SR_1$-$SR_2$ are shown as transistor switch devices in FIG. 1, but instead may be implemented as diodes which have no synchronous rectification (SR) control signals. If the secondary side rectifying devices $SR_1$-$SR_2$ are implemented as transistor switch devices, control of the secondary side rectifying devices $SR_1$-$SR_2$ follows the switches on the primary side.

In either configuration, an input power source $V_{in}$ provides power to the isolated power converter 100 and the converter 100 supplies output power to a load which is generically represented as a resistor $R_L$, The input power source $V_{in}$ is provided to the primary side of the converter 100, which couples it to the transformer 102 using the primary side switch devices $Q_1$-$Q_2$. Each of the primary side switch devices $Q_1$-$Q_2$ has an associated driver within a driver stage. The driver stage and related driver circuitry are not illustrated for ease of illustration, and any standard driver stage/circuitry may be used. The primary side switch devices $Q_1$-$Q_2$ are oriented in a half-bridge configuration in FIG. 1.

The primary side switch devices $Q_1$-$Q_2$ are illustrated in FIG. 1 as enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The primary side switch devices $Q_1$-$Q_2$ may be integrated on the same semiconductor die, may each be provided on separate dies, or may otherwise be spread across a plurality of semiconductor dies. The corresponding driving circuitry (not shown) may be integrated on the same semiconductor die(s) as their corresponding primary side switch devices $Q_1$-$Q_2$, or may be provided on separate dies.

The transformer 102 has a primary winding P with N1 turns, a secondary winding S with N2 turns, and a core 106. The transformer 102 of FIG. 1 also includes a leakage inductance, which is not a separate component but which models stray inductance that is not included in the windings P, S. Presuming the effect of the leakage inductance to be insignificant, the ratio N1/N2 determines the ratio of the rectified voltage $V_{rect}$ to the input voltage $V_{AB}$ of the transformer 102.

Operation of the isolated power converter 100 is described next in more detail during both non-transient and transient load conditions. A non-transient load condition means that the load current $i_L$ remains relatively unchanged, whereas a transient load condition means that an instantaneous or near instantaneous change in load current has occurred. The controller 104 is equipped to operate in both a non-transient mode during which the load current remains relatively unchanged, and in a transient mode during which instantaneous or near instantaneous changes in load current occur.

In general, the controller 104 is responsible for controlling the primary side switch devices $Q_1$-$Q_2$ and the secondary side rectifying devices $SR_1$-$SR_2$ (if implemented as transistors) to supply the necessary power (voltage $V_O$ and current $I_L$) to the load. This includes generating PWM waveforms that control the primary side switch devices $Q_1$-$Q_2$ and also the secondary side rectifying devices $SR_1$-$SR_2$ (if implemented as transistors). The PWM waveforms that control the primary side switch devices $Q_1$-$Q_2$ and the secondary side rectifying devices $SR_1$-$SR_2$ (if implemented as transistors) are generated to ensure that the load is supplied adequate power, and this generation is typically based upon the output voltage $V_O$ and/or the load current $I_L$. Conventional techniques are used to generate baseline PWM waveforms, based upon load requirements.

For example, a proportional, integral and derivative (PID) controller 108 included in or associated with the main controller 104 may use the output voltage $V_O$, a reference voltage $V_{ref}$ and the output of a standard AVP (adaptive voltage positioning) unit 109 to adaptively determine duty cycle. A digital pulse width modulator (DPWM) 110 may use the duty cycle information provided by the PID controller 108 to generate the PWM waveforms that control switching of the primary side switch devices $Q_1$-$Q_2$ and the secondary side rectifying devices $SR_1$-$SR_2$ (if implemented as transistors). Because such techniques are well-known, they will not be described further herein. Instead, the following description focuses on techniques for modifying the PWM waveforms to provide current balance in the output inductor windings $L_{O1}$, $L_{O2}$ of the secondary side current doubler rectifier during transient load conditions. To this end, a transient control unit 112 and a supervisor unit 114 included in or associated with the main controller 104 implement the transient control techniques described herein.

The controller 104 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 104 may also include memory, e.g., non-volatile memory such as flash that includes instructions or data for use by the processor circuitry, and one or more timers. The controller 104 inputs sensor signals such as signals corresponding to $V_O$ and $I_L$.

Figure 2:
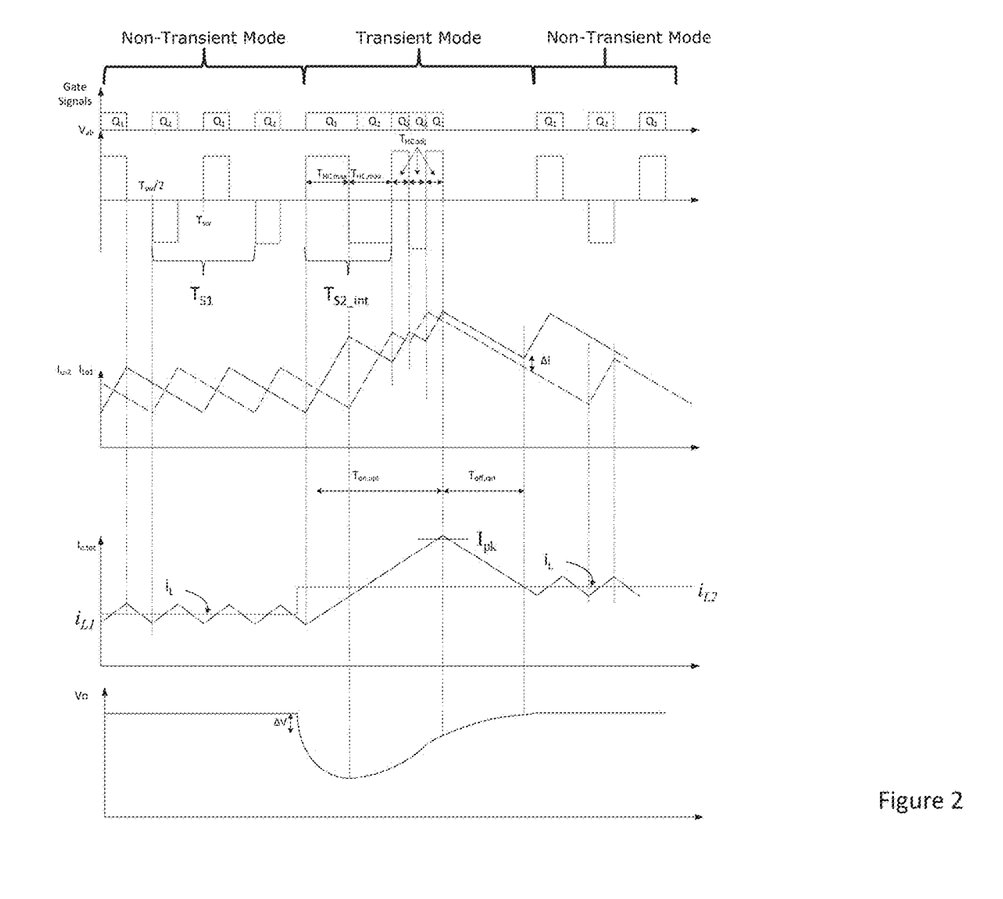
FIG. 2 illustrates waveforms associated with operation of the current doubler rectifier converter in both non-transient and transient modes.

Detailed operation of the isolated power converter 100 is described next with reference to FIG. 2. FIG. 2 illustrates various waveforms associated with operation of the isolated power converter 100 in both the non-transient and transient modes. These waveforms include voltage $V_{AB}$ across the primary winding P of the transformer 102, currents $I_{Lo1}$, $I_{Lo2}$ in the respective output inductor windings $L_{O1}$, $L_{O2}$ of the current doubler rectifier, total current $I_{o,tot}$ delivered by the isolated power converter 100 to the load ($I_{o,tot}=I_{Lo1}+I_{Lo2}$), and voltage $V_O$ across the output capacitor $C_O$ of the isolated power converter 100. FIG. 2 also shows a transient load condition in which the load current $i_L$ changes from a first (lower) target value to a second (higher) target value $i_{L2}$. During this transition in the target current, the controller 104 operates in the transient mode in which the transient control unit 112 and the supervisor unit 114 control switching of the primary side switch devices $Q_1$-$Q_2$ and the secondary side rectifying devices $SR_1$-$SR_2$. Before and after the transition, the controller 104 operates in the non-transient mode in which the PID controller 108 and the DPWM 110 control switching of the primary side switch devices $Q_1$-$Q_2$ and the secondary side rectifying devices $SR_1$-$SR_2$.

Non-Transient Mode

During an energy transfer interval within a positive half-cycle of the input power source $V_{in}$, primary side switch device $Q_1$ is conducting via a corresponding PWM signal, thereby producing a positive voltage $+V_{AB}$ across the primary winding P of the transformer 102. During an energy transfer interval within a negative half-cycle of the input power source $V_{in}$, primary side switch device $Q_2$ is conducting via a corresponding PWM signal, thereby providing a negative voltage $-V_{AB}$ across the primary winding P of the transformer 102. Energy circulation intervals occur between successive energy transfer intervals. For PWM control, a so-called dead time occurs during the energy circulation intervals in which none of the primary side switch devices $Q_1$-$Q_2$ are conducting and no voltage is provided across the primary winding P of the transformer 102, Current does not flow in the primary side during energy circulation intervals under PWM control, only in the secondary side. The operational details of the isolated power converter 100 are described herein in the context of PWM control for ease and simplicity of explanation. However, those skilled in the art will readily understand that the techniques described herein equally apply to PSM control.

With a standard PWM-based approach, the controller 104 switches the primary side switch devices $Q_1$-$Q_2$ at a fixed (constant) first switching period $T_{S1}$ and variable duty cycle D during non-transient load conditions to transfer energy across the transformer 102 during first (non-transient mode) energy transfer intervals which are separated by energy circulation intervals. The PID controller 108 determines the variable duty such that the ratio of each energy transfer interval $T_{energyTx}$ to the fixed switching period $T_{S1}$ is less than unity i.e. $T_{energyTx}/T_{S1}<1$. Accordingly, as shown in FIG. 2, ample dead time is provided between energy transfer intervals to allow the controller 104 to react to a transient load condition.

Transient Mode

During a transient load condition, the controller 104 switches the primary side switch devices $Q_1$-$Q_2$ and the secondary side rectifying devices $SR_1$-$SR_2$ of the current doubler rectifier at a second (transient mode) initial switching period $T_{S2\_int}$ different than the first (non-transient mode) switching period $T_{S1}$ so as to transfer energy across the transformer 102 during second (transient mode) energy transfer intervals each of an initial duration $T_{HC,max}$, and such that any energy circulation interval separating the transient mode energy transfer intervals is shorter than the energy circulation intervals separating the non-transient mode energy transfer intervals. Each switching period in the transient mode has two energy transfer intervals, one of which is a positive half cycle of the switching period (when $Q_1$ is on and $Q_2$ is off) and a negative half cycle of the switching period (when $Q_2$ is on and $Q_1$ is off). Energy is transferred across the transformer 102 of the isolated power converter 100 to the current doubler rectifier during the positive half cycle and the negative half cycle of each switching period.

The initial transient mode switching period $T_{S2\_int}$ may be greater than or less than the non-transient mode switching period $T_{S1}$. If the initial transient mode switching period $T_{S2\_int}$ is less than the non-transient mode switching period $T_{S1}$, the primary side switch devices $Q_1$-$Q_2$ are switched at a higher switching frequency in the transient mode than in the non-transient mode.

The controller 104 may detect a transient load condition e.g. based on $V_O$ and/or $I_L$. In response to a transient load condition, the transient control unit 112 determines the initial transient mode switching period $T_{S2\_int}$ based on the initial duration $T_{HC,max}$ of the energy transfer intervals i.e. the positive and negative half cycles in the transient mode which correspond to the width of the ON time pulses applied to the primary side half bridge switch devices $Q_1$-$Q_2$. In some case, the initial duration $T_{HC,max}$ of the positive and negative half cycles for the initial switching period $T_{S2\_int}$ in the transient mode can be the same for all transient load conditions. In other cases, the initial duration $T_{HC,max}$ of the positive and negative half cycles for the initial switching period $T_{S2\_int}$ in the transient mode can be determined as a function of the magnitude of the transient load condition. This way, different $T_{HC,max}$ values can be assigned to different types of transient load conditions. The controller 104 can determine the type of transient load condition e.g. based on $V_O$ and/or $I_L$, and the transient control unit 112 can select the corresponding $T_{HC,max}$ value assigned to the positive and negative half cycles of the initial switching period $T_{S2\_int}$ in the transient mode.

In the transient mode, the transient control unit 112 adjusts the primary side PWM sequence to obtain fast transient response while balancing the currents $I_{Lo1}$, $I_{Lo2}$ in the respective output inductor windings $L_{O1}$, $L_{O2}$ of the current doubler rectifier. In response to a transient load condition, the transient control unit 112 switches the primary side switch devices $Q_1$-$Q_2$ of the half bridge, as well as secondary side rectifying devices $SR_1$-$SR_2$ of the current doubler rectifier at an initial switching period $T_{S2\_int}$ having a positive half cycle and a negative half cycle to transfer energy across the transformer 102 during the positive half cycle and the negative half cycle. The transient control unit 112 ensures the positive half cycle and the negative half cycle of the initial switching period $T_{S2\_int}$ have the same initial duration $T_{HC,max}$.

The transient control unit 112 then symmetrically reduces the duration of the positive half cycle and the negative half cycle for at least one subsequent switching period during the transient load condition. In FIG. 2, the new duration of the positive and negative half cycles is labelled $T_{HC,adj}$ for each subsequent switching period after the initial switching period $T_{S2\_int}$. Also in FIG. 2, only one complete switching period occurs after the initial switching period $T_{S2\_int}$ before the output current $I_{o,tot}$ of the isolated power converter 100 reaches a peak current limit $I_{pk}$. When the peak current limit $I_{pk}$ is reached or expected to be reached, the transient control unit 112 either terminates the present PWM pulse (e.g. last transient mode pulse $Q_1$ in FIG. 2) or allows the present PWM pulse to complete before halting the PWM sequence. In yet another embodiment, if the remaining time (before Ipk is reached) is less than twice the initial duration $T_{HC,max}$ or less than twice the initial duration $T_{HC,max}$ plus twice the minimum duration $T_{HC,min}$, the remaining time is divided evenly for each half cycle. The resulting half cycle duration is less than the initial calculated value, but may be greater than the minimum value $T_{HC,min}$ in the second scenario. In each case, the PWM sequence remains halted once $I_{pk}$ is reached, with the primary side switch devices $Q_1$-$Q_2$ off, and secondary side rectifying devices $SR_1$-$SR_2$ on or off, until the output current $I_{o,tot}$ of the isolated power converter 100 drops to the new target value $i_{L2}$ after which point the supervisor unit controller 114 permits the PID controller 108 and the DPWM 110 to resume primary side switching in the non-transient mode as previously explained herein.

Figure 3:
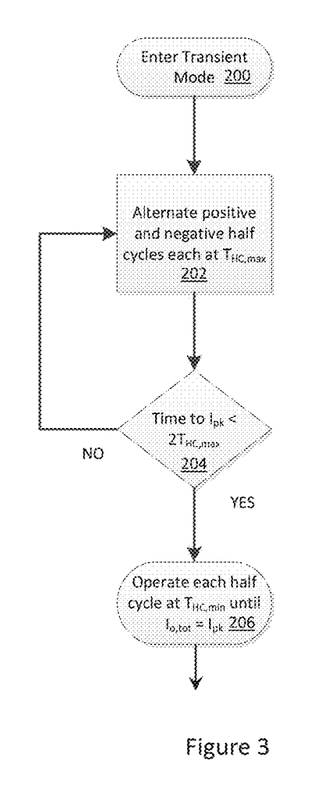
FIG. 3 illustrates a flow diagram of an embodiment of the transient mode.

FIG. 3 illustrates one embodiment of the transient mode control technique. The controller 104 enters the transient mode responsive to detecting a transient load condition e.g. based on $V_O$ and/or $I_L$ (Block 200). The transient control unit 112 switches the half bridge primary side switch devices $Q_1$-$Q_2$ and the secondary side rectifying devices $SR_1$-$SR_2$ of the current doubler rectifier at an initial switching period $T_{S2\_int}$ having a positive half cycle and a negative half cycle to transfer energy across the transformer 102 during the positive half cycle and the negative half cycle (Block 202). The positive half cycle and the negative half cycle of the initial switching period $T_{S2\_int}$ have the same initial duration $T_{HC,max}$. The transient control unit 112 determines whether the total current $I_{o,tot}$ delivered by the isolated power converter 100 is expected to reach a peak current limit $I_{pk}$ in less than twice the initial duration during the next switching period (Block 204). The isolated power converter 100 includes ADCs (analog-to-digital converters) 116, 118, 120 for measuring the inductor currents $i_{Lo1}$, $i_{Lo2}$ and the total current $I_{o,tot}$ delivered by the isolated power converter 100 to enable the transient control unit 112 to make this determination. The transient control unit 112 can calculate the time remaining to the peak current limit $I_{pk}$ based on the current measurements, based on the new target load current $i_{L2}$, based on the calculated stored charge in capacitor $C_O$, etc.

If the transient control unit 112 determines that the total current $I_{o,tot}$ delivered by the isolated power converter 100 is expected to reach the peak current limit $I_{pk}$ in less than twice the initial duration $T_{HC,max}$ assigned to the positive and negative half cycles during the next switching period, then the transient control unit 112 reduces the duration of the positive half cycle and the negative half cycle for the subsequent switching period to the same minimum duration $T_{HC,min}$ determined for the positive half cycle and the negative half cycle (Block 206). Thus, according to this embodiment, the transient control unit 112 reduces the duration of the positive half cycle and the negative half cycle from the maximum initial value $T_{HC,max}$ to the minimum assigned value $T_{HC,min}$ in a single step.

The minimum assigned value $T_{HC,min}$ is selected so that the last pulse applied in the transient mode is narrow enough (smaller than $H_{C,max}$) so that the last pulse does not create too much imbalance. The transient mode does not begin at $T_{HC,min}$ because the primary side switch devices $Q_1$-$Q_2$ would be switched at a much higher frequency at the beginning of the transient load condition in this case, increasing switching losses of the system. The selection of $T_{HC,min}$ and the transition to $T_{HC,min}$ is a trade-off between switching losses and current imbalance, and depends on the requirements placed on the system in which the transient mode control technique is used.

In some cases, the change to $T_{HC,min}$ may occur before the condition in Block 204 is satisfied and more than one complete switching period may complete before the total current $I_{o,tot}$ delivered by the current doubler rectifier reaches the peak current limit $I_{pk}$. In these cases, the transient control unit 112 maintains the minimum duration $T_{HC,min}$ of the positive half cycle and the negative half cycle for each subsequent switching period while the total current $I_{o,tot}$ delivered by the isolated power converter 100 continues to ramp up toward $I_{pk}$ during the transient load condition.

Figure 4:
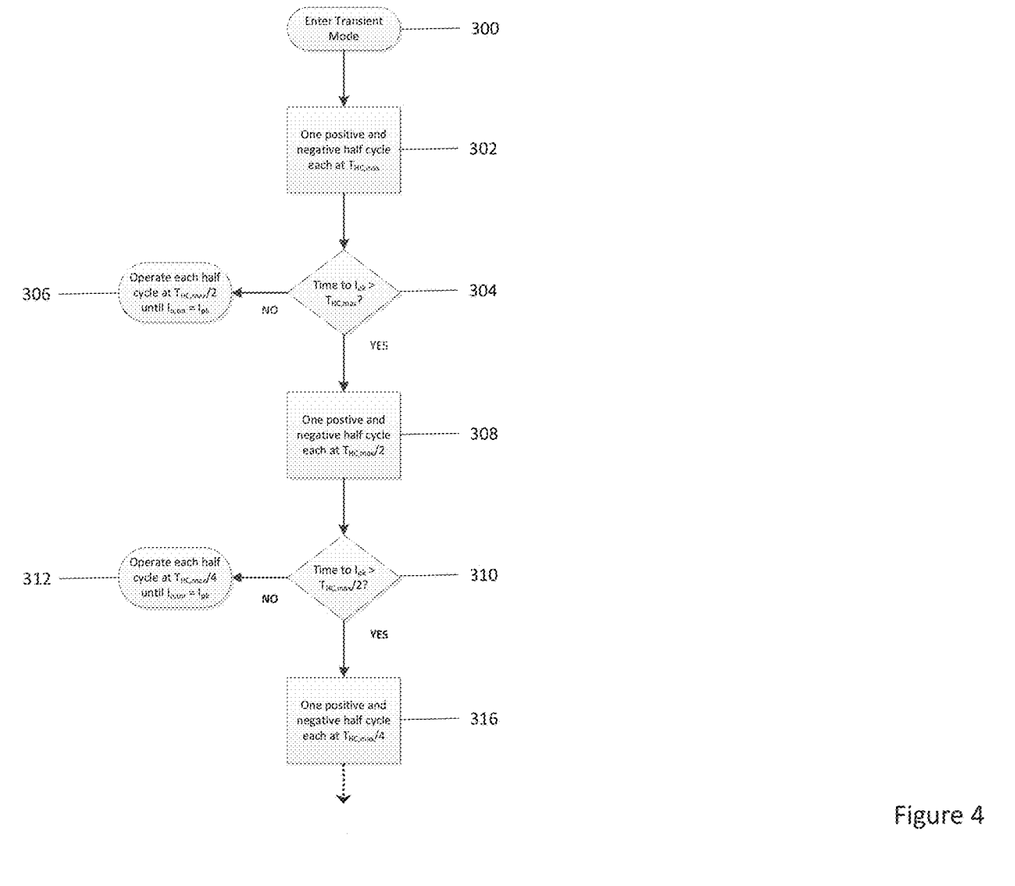
FIG. 4 illustrates a flow diagram of another embodiment of the transient mode.

FIG. 4 illustrates another embodiment of the transient mode control technique. The controller 104 enters the transient mode responsive to detecting a transient load condition e.g. based on $V_O$ and/or $I_L$ (Block 300). The transient control unit 112 switches the half bridge primary side switch devices $Q_1$-$Q_2$ and the secondary side rectifying devices $SR_1$-$SR_2$ of the current doubler rectifier at an initial switching period $T_{S2\_int}$ having a positive half cycle and a negative half cycle to transfer energy across the transformer 102 during the positive half cycle and the negative half cycle (Block 302). The positive half cycle and the negative half cycle of the initial switching period $T_{S2\_int}$ have the same initial duration $T_{HC,max}$. The transient control unit 112 determines whether the total current $I_{o,tot}$ delivered by the isolated power converter 100 is expected to reach the peak current limit $I_{pk}$ in less than twice the initial duration during the next switching period e.g. as described above in connection with FIG. 3 (Block 304).

If the transient control unit 112 determines that the total current $I_{o,tot}$ delivered by the current doubler rectifier is expected to reach the peak current limit $I_{pk}$ in less than the initial duration $T_{HC,max}$ assigned to the positive and negative half cycles during the next switching period, the transient control unit 112 reduces the duration of the positive half cycle and the negative half cycle for the next switching period by half to $T_{HC,max}/2$ (Block 306). Several scenarios are possible in this case. The positive half cycle ($Q_1$) may terminate before $T_{HC,max}/2$, the positive half cycle ($Q_1$) may complete but there is no negative half cycle ($Q_2$), or the positive half cycle ($Q_1$) may complete but the negative half cycle ($Q_2$) terminates before $T_{HC,max}/2$.

However, if the transient control unit 112 determines that the total current $I_{o,tot}$ delivered by the isolated power converter 100 is not expected to reach the peak current limit $I_{pk}$ in less than the initial duration $T_{HC,max}$ assigned to the positive and negative half cycles during the next switching period, the transient control unit 112 reduces the duration of the positive half cycle and the negative half cycle for the next switching period by half i.e. $T_{HC,max}/2$ and completes one full switching period (Block 308). After this switching period, the transient control unit 112 determines whether the total current $I_{o,tot}$ delivered by the isolated power converter 100 is expected to reach the peak current limit $I_{pk}$ in less than $T_{HC,max}/2$ (Block 310).

If the transient control unit 112 then determines that the total current $I_{o,tot}$ delivered by the current doubler rectifier is expected to reach the peak current limit $I_{pk}$ in less than $T_{HC,max}/2$, the transient control unit 112 reduces the duration of the positive half cycle and the negative half cycle for the next switching period by half again to $T_{HC,max}/4$ (Block 312). The same scenarios described above are again possible in this case. The positive half cycle ($Q_1$) may terminate before $T_{HC,max}/4$, the positive half cycle ($Q_1$) may complete but there is no negative half cycle ($Q_2$), or the positive half cycle ($Q_1$) may complete but the negative half cycle ($Q_2$) terminates before $T_{HC,max}/4$.

However, if the transient control unit 112 determines that the total current $I_{o,tot}$ delivered by the current doubler rectifier is not expected to reach the peak current limit $I_{pk}$ in less than $T_{HC,max}/2$ during the next switching period, the transient control unit 112 again reduces the duration of the positive half cycle and the negative half cycle for the next switching period by half to $T_{HC,max}/4$ and completes one full switching period (Block 316). The process of reducing the duration of the positive half cycle and the negative half cycle for a subsequent switching period continues until the duration reaches a minimum duration $T_{HC,min}$ determined for the positive half cycle and the negative half cycle, or until the total current $I_{o,tot}$ delivered by the isolated power converter 100 reaches the peak current limit $I_{pk}$.

If the duration of the positive half cycle and the negative half cycle were reduced to $T_{HC,min}$ but the total current $I_{o,tot}$ delivered by the current doubler is not expected to reach the peak current limit $I_{pk}$ for at least one more complete switching period, the transient control unit 112 would maintain the minimum duration $T_{HC,min}$ of the positive half cycle and the negative half cycle for each subsequent switching period while the total current $I_{o,tot}$ continues to ramp up toward $I_{pk}$ during the transient load condition. In general, the duration of the positive half cycle and negative half cycle can be symmetrically reduced by the same amount each subsequent switching cycle in the transient mode. That amount can be something value other than a 50% reduction. For example, the converter may be operating at a pulse duration greater than the minimum duration and then split the remaining time. In a specific non-limiting example, the converter may be operating at ½ $T_{HC,max}$ and ¼ $T_{HC,max}$ is $T_{HC,min}$. However, the equivalent of ⅓ duration remains before $I_{o,tot}$ reaches $I_{pk}$, so the converter uses a symmetric positive and negative half cycle duration of ⅓ $T_{HC,max}$ for the next switching period.

In many of the embodiments described herein, reduction of the positive and negative half cycles based on timing criteria are meant to illustrate possible implementation examples. However, reduction can be autonomous and independent of time without loss of benefit. For example, the transient control unit 112 may enter the transient mode and switch the primary side and secondary side switching devices $Q_1$-$Q_2$, $SR_1$-$SR_2$ with a switching period of $T_{S2\_int}$. After one complete switching period, the positive and negative half cycles are reduced symmetrically to result in a new switching period $T_{S2b}$ such that $T_{S2b}$ is less than $T_{S2\_int}$. After one complete switching period of duration $T_{S2b}$, the positive and negative half cycles are again reduced symmetrically to result in a new switching period $T_{S2c}$ such that $T_{S2c}$ is less than $T_{S2b}$. After one complete switching period of duration $T_{S2c}$, the positive and negative half cycles are again reduced symmetrically. This process of symmetric half cycle reduction continues until the current $I_{o,tot}$ of the isolated power converter 100 reaches a peak current limit $I_{pk}$, or until the duration of each half cycle reaches its minimum value $T_{HC,min}$. There are then three possible operation scenarios with this embodiment. The current of the isolated power converter 100 may reach the peak current limit $I_{pk}$ before the positive and negative half cycles have been reduced to the minimum value of $T_{HC,min}$. The current $I_{o,tot}$ of the isolated power converter 100 may reach the peak current limit $I_{pk}$ after one complete switching period where the duration of the positive and negative half cycles equal $T_{HC,min}$. The duration of the positive and negative half cycles may reduce symmetrically to the minimum value of $T_{HC,min}$ prior to the current $I_{o,tot}$ of the isolated power converter 100 reaching the peak current limit $I_{pk}$. In this case, the isolated power converter 100 operates with positive and negative half cycles of duration $T_{HC,min}$ until the current $I_{o,tot}$ reaches the peak current limit $I_{pk}$.

According to another embodiment of the transient mode control technique, the transient control unit 112 symmetrically reduces the duration of the positive half cycle and the negative half cycle for at least one subsequent switching period during a transient load condition by comparing a measured voltage parameter of the isolated power converter 100 to stored values associated with different switching period durations and reducing the duration of the positive half cycle and the negative half cycle to the switching period duration associated with the stored value that most closely matches the measured voltage parameter. For example, a lookup table of delta $V_O$ values, voltage excursion values, minimum voltage values, etc. can be accessible by the transient control unit 112. Or a user may input a voltage threshold that justifies entering the transient mode of operation. In each case, the transient control unit 112 can decide when to symmetrically reduce the duration of the positive half cycle and the negative half cycle based on a voltage parameter so that enough time is provided for one complete switching period, so that the transient control unit 112 has sufficient time to perform the calculations used to indicate how many more maximum half cycles $T_{HC,max}$ remain before the pulse width should be scaled back to ensure the desired amount of current balancing.

Transitioning from transient control to PWM can be problematic if the PWM pulse is applied to the phase that has the higher current. This may cause even more imbalance and may lead to saturation. In one embodiment, a current balance pulse can be inserted of a duration $T_{Ibal}$. The current balance pulse is applied to the half cycle with the lowest inductor current. After the current balance pulse, the PID 108 resumes steady-state operation. According to another embodiment, the current balance pulse is not applied and instead the first PWM pulse is directly to the half-cycle with lower current.

Figure 5:
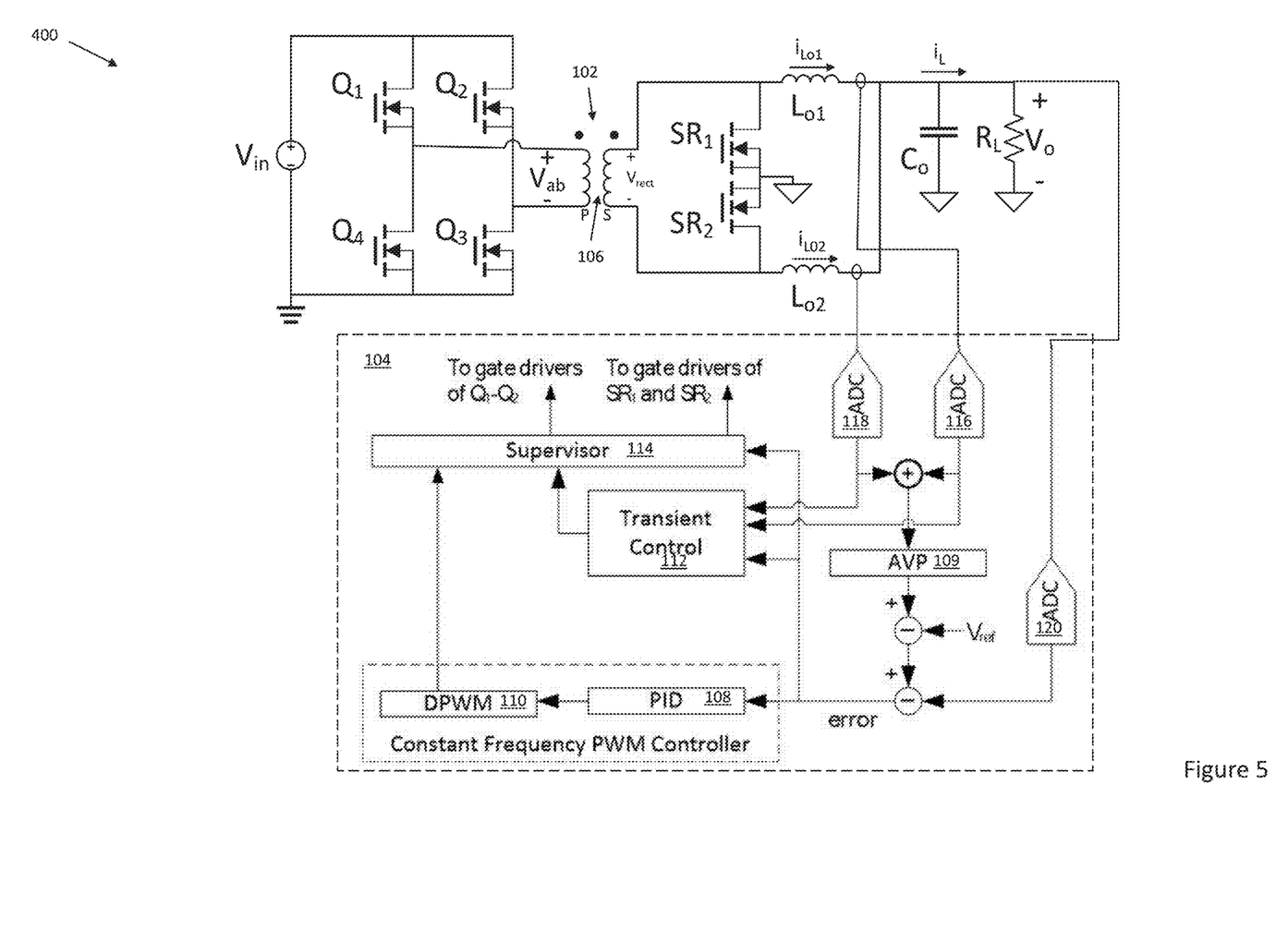
FIG. 5 illustrates a schematic diagram of the current doubler rectifier having a full-bridge primary side configuration.

The transient mode control techniques described previously herein can be extended to full-bridge converters with current doubler rectifiers. An exemplary full-bridge converter with current doubler rectifier 400 is illustrated in FIG. 5. In FIG. 5, the primary side includes four switch devices $Q_1$-$Q_4$. The transient mode control techniques described previously herein are directly applicable to the full-bridge topology shown in FIG. 5, by substituting full-bridge switching operation for half-bridge control. This means that during an energy transfer interval within a positive half-cycle of the input power source $V_{in}$, primary side switching devices $Q_1$ and $Q_3$ are conducting via respective PWM signals, thereby producing a positive voltage +$V_{AB}$ across the primary winding P of the transformer 102. During an energy transfer interval within a negative half-cycle of the input power source $V_{in}$ primary side switching devices $Q_2$ and $Q_4$ are conducting via respective PWM signals, thereby providing a negative voltage −$V_{AB}$ across the primary winding P of the transformer 102. Otherwise, operation of the isolated power converters 100, 400 shown in FIGS. 1 and 5 is the same. In these systems, the initial duration $T_{HC,max}$ of the positive half cycle and the negative half cycle for the first switching period in the transient mode is selected to avoid saturation of the transformer core. The transient mode control techniques described previously herein also can be extended to other rectifier topologies.

Figure 6:
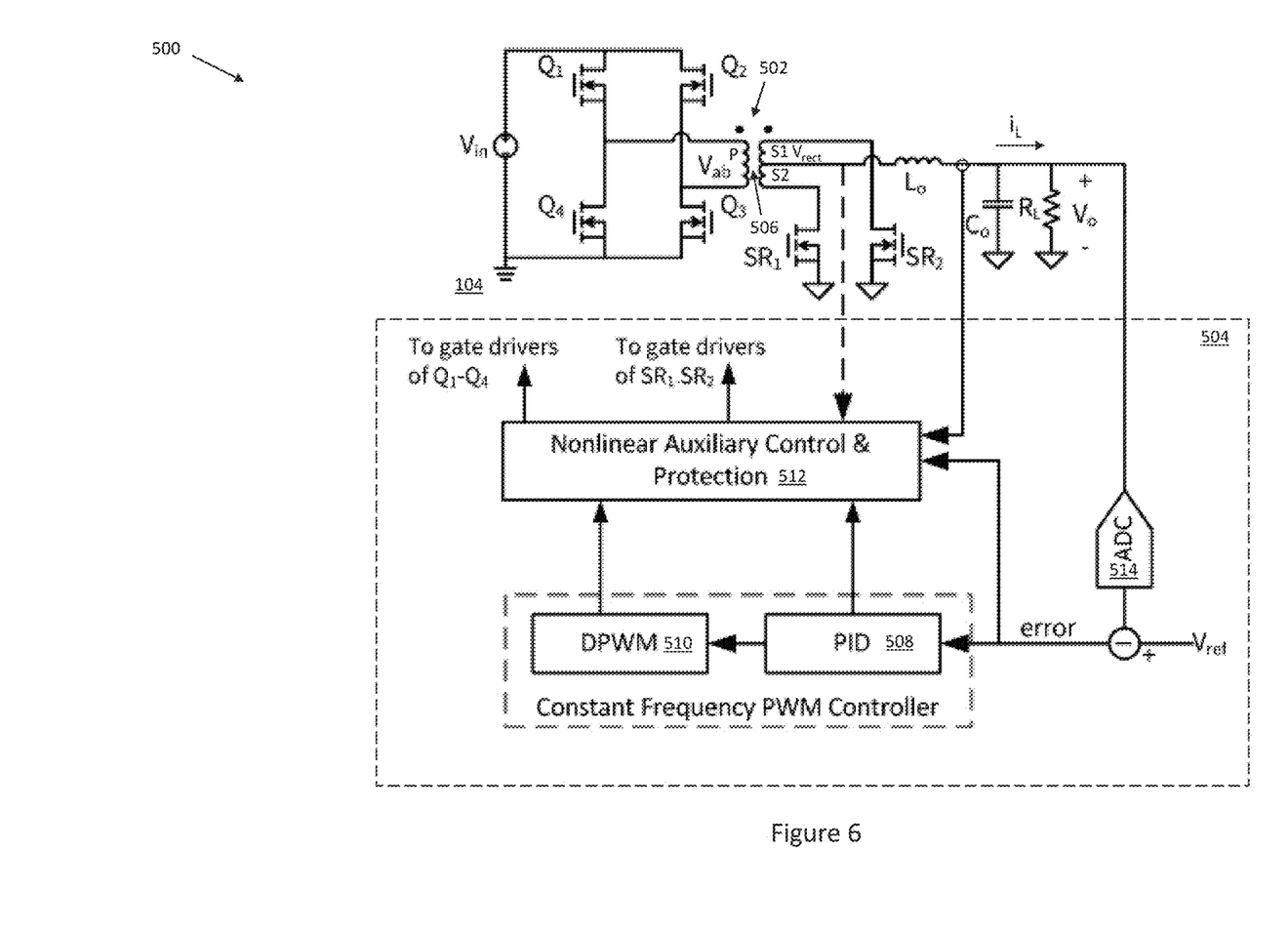
FIG. 6 illustrates a schematic diagram of a full-bridge converter with center-tap rectifier.

FIG. 6 illustrates an embodiment of a full-bridge converter with full-wave rectifier 500 within which the control techniques described herein may be implemented. The illustrated full-wave rectifier 500 has a center-tap rectifier configuration, but the techniques described herein also apply to other rectifier topologies that use the same signals as the center-tap configuration; including a full-bridge configuration. The full-bridge converter with full-wave rectifier 500 has a primary side which includes primary side switch devices $Q_1$-$Q_4$, a secondary side which includes secondary side rectifying devices $SR_1$-$SR_2$, a transformer 502 coupling the primary side switch devices $Q_1$-$Q_4$ to the secondary side rectifying devices $SR_1$-$SR_2$, and a controller 504 for controlling operation of the full-wave rectifier 500.

The transient mode control techniques described herein control the switching of the primary side switch devices $Q_1$-$Q_4$, and indirectly control the secondary side rectifying devices $SR_1$-$SR_2$ as the secondary side rectifying device control signals are generated as a function of the primary side switch device control signals. The secondary side rectifying devices $SR_1$-$SR_2$ are shown as transistor switch devices in FIG. 1, but instead may be implemented as diodes which have no synchronous rectification (SR) control signals. If the secondary side rectifying devices $SR_1$-$SR_2$ are implemented as transistor switch devices, the secondary side rectifying devices $SR_1$-$SR_2$ follow the corresponding switches on primary side.

In either configuration, an input power source $V_{in}$ provides power to the full-wave rectifier 500 and the full-wave rectifier 500 supplies output power to a load which is generically represented as a resistor $R_L$. The input power source $V_{in}$ is provided to the primary side of the full-wave rectifier 500, which couples it to the transformer 502 using the primary side switch devices $Q_1$-$Q_4$. Each of the primary side switch devices $Q_1$-$Q_4$ has an associated driver within a driver stage. The driver stage and related driver circuitry are not illustrated for ease of illustration, and any standard driver stage/circuitry may be used. The primary side switch devices $Q_1$-$Q_4$ are oriented in a full-bridge configuration in FIG. 6.

The primary side switch devices $Q_1$-$Q_4$ at are illustrated in FIG. 6 as enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The primary side switch devices $Q_1$-$Q_4$ may be integrated on the same semiconductor die, may each be provided on separate dies, or may otherwise be spread across a plurality of semiconductor dies. The corresponding driving circuitry (not shown) may be integrated on the same semiconductor die(s) as their corresponding primary side switch devices $Q_1$-$Q_4$, or may be provided on separate dies.

The transformer 502 has a primary winding P with N1 turns, secondary windings S1, S2 with N2 turns each, and a core 506. The transformer 502 of FIG. 6 also includes a leakage inductance, which is not a separate component but which models stray inductance that is not included in the windings P, S1, S2. The secondary windings S1, S2 are connected at a center tap in FIG. 6. A rectified voltage node is coupled to this center tap. Presuming the effect of the leakage inductance to be insignificant, the ratio N1/N2 determines the ratio of the rectified voltage $V_{rect}$ to the input voltage $V_{AB}$ of the transformer 502.

Operation of the full-wave rectifier 500 is described next in more detail during both non-transient and transient load conditions. The controller 504 is equipped to operate in both a non-transient mode during which the load current remains relatively unchanged, and in a transient mode during which instantaneous or near instantaneous changes in load current occur.

In general, the controller 504 is responsible for controlling the primary side switch devices $Q_1$-$Q_4$ and the secondary side rectifying devices $SR_1$ and $SR_2$ (if implemented as transistors) to supply the necessary power (voltage $V_O$ and current $I_L$) to the load. This includes generating PWM waveforms that control the primary side switch devices $Q_1$-$Q_4$ and also the secondary side rectifying devices $SR_1$ and $SR_2$ (if implemented as transistors). The PWM waveforms that control the primary side switch devices $Q_1$-$Q_4$ and the secondary side rectifying devices $SR_1$ and $SR_2$ (if implemented as transistors) are generated to ensure that the load is supplied adequate power, and this generation is typically based upon the output voltage $V_O$ and/or the load current $I_L$. Conventional techniques are used to generate baseline PWM waveforms, based upon load requirements.

For example, a proportional, integral and derivative (PID) controller 508 included in or associated with the main controller 504 may use the output voltage $V_O$ to adaptively determine duty cycle. A digital pulse width modulator (DPWM) 510 included in or associated with the main controller 504 may use the duty cycle information provided by the PID controller 508 to generate the PWM waveforms that control switching of the primary side switch devices $Q_1$-$Q_4$ and the secondary side rectifying devices $SR_1$ and $SR_2$ (if implemented as transistors). Because such techniques are well-known, they will not be described further herein. Instead, the following description focuses on the unique aspects of this invention, which are directed to techniques for modifying the PWM waveforms to prevent saturation of the transformer core 106 during transient load conditions. To this end, the controller 504 includes a transient auxiliary control and protection unit 512 for implementing the transformer core saturation avoidance techniques described herein.

The controller 504 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 504 may also include memory, e.g., non-volatile memory such as flash that includes instructions or data for use by the processor circuitry, and one or more timers. The controller 504 inputs sensor signals such as signals corresponding to $V_O$ and $I_L$, e.g. as provided by an ADC 514.

Figure 7:
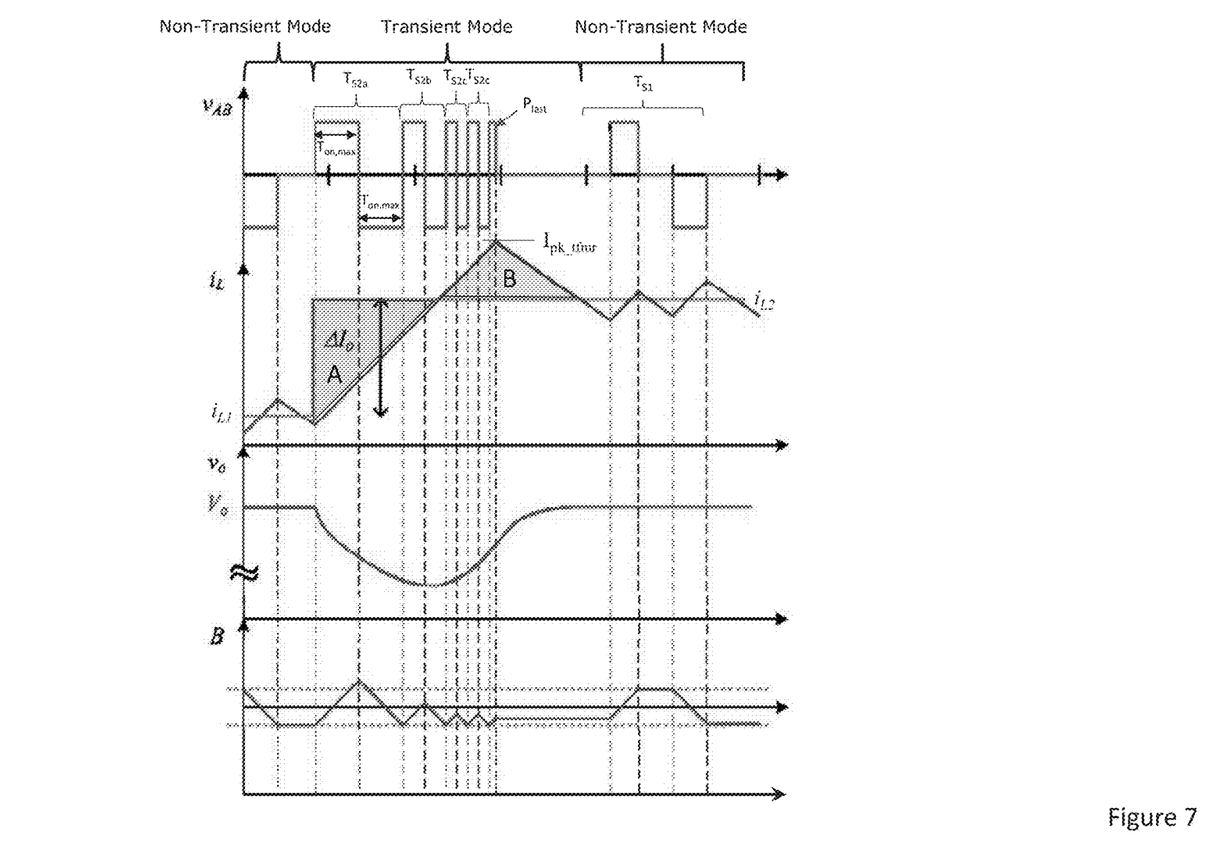
FIG. 7 illustrates waveforms associated with operation of the full-bridge converter in both non-transient and transient modes.

Detailed operation of the full-wave rectifier 500 is described next with reference to FIG. 7. FIG. 7 illustrates various waveforms associated with operation of the full-bridge converter and full-wave rectifier 500 in both the non-transient and transient modes. These waveforms include voltage $V_{AB}$ across the primary winding P of the transformer 502, current $i_L$ in the output inductor $L_O$ of the full-wave rectifier 500, voltage $V_O$ across the output capacitor $C_O$ of the full-wave rectifier 500, and magnetic flux density B of the transformer core 506. FIG. 7 also shows a transient load condition in which the load current changes from a first (lower) target value $i_{L1}$ to a second (higher) target value $i_{L2}$ and the corresponding difference $\Delta I_O$. During this transition in the target current, the controller 504 operates in the transient mode. Before and after the transition, the controller 504 operates in the non-transient mode.

Non-Transient Mode

During an energy transfer interval within a positive half-cycle of the input power source $V_{in}$, primary side switch devices $Q_1$ and $Q_3$ are conducting via respective PWM signals, thereby producing a positive voltage $+V_{AB}$ across the primary winding P of the transformer 502. During an energy transfer interval within a negative half-cycle of the input power source $V_{in}$, primary side switch devices $Q_2$ and $Q_4$ are conducting via respective PWM signals, thereby providing a negative voltage $-V_{AB}$ across the primary winding P of the transformer 502. Energy circulation intervals occur between successive energy transfer intervals. For PWM control, a so-called dead time occurs during the energy circulation intervals in which none of the primary side switch devices $Q_1$-$Q_4$ are conducting and no voltage is provided across the primary winding P of the transformer 502. Current does not flow in the primary side during energy circulation intervals under PWM control, only in the secondary side. For phase shift modulation (PSM) control, primary side switch devices $Q_1$ and $Q_2$ conduct circulating current; or primary side switch devices $Q_3$ and $Q_4$ conduct circulating current during energy circulation intervals. As such, current circulates in both the primary and secondary sides during energy circulation intervals under PSM control. The operational details of the full-wave rectifier 500 are described herein in the context of PWM control for ease and simplicity of explanation. However, those skilled in the art will readily understand that the techniques described herein equally apply to PSM control.

With a standard PWM-based approach, the controller 504 switches the primary side switch devices $Q_1$-$Q_4$ at a fixed (constant) first switching period $T_{S1}$ and variable duty cycle D during non-transient load conditions to transfer energy across the transformer 502 during first (non-transient mode) energy transfer intervals which are separated by energy circulation intervals. The PID controller 508 determines the variable duty such that the ratio of each energy transfer interval $T_{energyTx}$ to the fixed switching period $T_{S1}$ is less than unity i.e. $T_{energyTx}/T_{S1}<1$. Accordingly, as shown in FIG. 7, ample dead time is provided between energy transfer intervals to allow the controller 504 to react to a transient load condition.

Transient Mode

During a transient load condition, the transient auxiliary control and protection unit 512 included in or associated with the controller 504 switches the primary side switch devices $Q_1$-$Q_4$ of the full-wave rectifier 500 at a second (transient mode) initial switching period $T_{S2a}$ different than the first (non-transient mode) switching period $T_{S1}$ to transfer energy across the transformer 502 during second (transient mode) energy transfer intervals of a duration $T_{on,max}$, and such that any energy circulation interval separating the transient mode energy transfer intervals is shorter than the energy circulation intervals separating the non-transient mode energy transfer intervals.

Each switching period in the transient mode has two energy transfer intervals, one of which is a positive half cycle of the switching period (when $Q_1$ and $Q_3$ are on and $Q_2$ and $Q_4$ are off) and a negative half cycle of the switching period (when $Q_2$ and $Q_4$ are on and $Q_1$ and $Q_3$ are off). Energy is transferred across the transformer 502 of the full-wave rectifier 500 during each the positive half cycle and the negative half cycle of each switching period.

The initial transient mode switching period $T_{S2a}$ may be greater than or less than the non-transient mode switching period $T_{S1}$. If the initial transient mode switching period $T_{S2a}$ is less than the non-transient mode switching period $T_{S1}$, the primary side switch devices $Q_1$-$Q_4$ are switched at a higher switching frequency in the transient mode than in the non-transient mode.

The controller 504 may detect a transient load condition e.g. based on $V_O$ and/or $I_L$. In response to a transient load condition, the transient auxiliary control and protection unit 512 determines the initial transient mode switching period $T_{S2a}$ based based on the duration $T_{on,max}$ of the energy transfer intervals in the transient mode which correspond to the width of the ON time pulses applied to the primary side switch devices $Q_1$-$Q_4$ of the full-wave rectifier 500. The duration $T_{on,max}$ of the transient mode energy transfer intervals is determined to avoid saturation of the transformer core 506. If the transient mode energy transfer intervals were to exceed $T_{on,max}$, the magnetic flux density B in the transformer core 506 would increase/decrease to its positive/negative saturation limit.

The input voltage $V_{in}$ effects the slew rate of the magnetic flux density in the transformer core 506. An increase in $V_{in}$ correspondingly increases the slew rate of the magnetic flux density. The transient auxiliary control and protection unit 512 may adjust the initial duration $T_{on,max}$ of the energy transfer intervals in the transient mode accordingly. For example, higher $V_{in}$ translates to narrower initial $T_{on,max}$ pulses in the transient mode. By adjusting the initial duration $T_{on,max}$ of the energy transfer intervals in the transient mode based on a new input voltage magnitude for the full-bridge converter with full-wave rectifier 500, saturation of the transformer core 506 may be avoided for the new input voltage magnitude during the transient load condition. Because the initial switching period $T_{S2a}$ for the transient mode is derived from an initial duration $T_{on,max}$ selected to avoid transformer core saturation in this full-wave rectifier embodiment, the transient auxiliary control and protection unit 512 also adjusts the initial switching period $T_{S2a}$ based on the newly determined duration of the transient mode energy transfer intervals.

Various embodiments for determining the initial duration $T_{on,max}$ are described in more detail later herein. Switching period $T_{S1}$ is determined in a wholly different manner in the non-transient mode. In the non-transient mode, switching period $T_{S1}$ is fixed (constant) and determined based on various system parameters. The variable duty cycle of the PWM signals applied to the primary side switch devices $Q_1$-$Q_4$ during the non-transient mode is determined based on e.g. the output voltage $V_O$ and the switching frequency. As such, frequency is not used to provide regulation on the output in the non-transient mode, but switching frequency will change in the transient mode so that the necessary energy transfer is provided for the output inductor $L_O$.

The variable duty cycle (D) and ON time of the primary side switch devices $Q_1$-$Q_4$ are related by switching period in the non-transient mode as given by Ton=D*$T_{S1}$. The maximum duty cycle Dmax may be set by the user, e.g. based on transformer saturation (Volt-seconds) limits.

In the transient mode, the maximum duty cycle Dmax translates to an initial duration $T_{on,max}$ which avoids saturation of the transformer core 106 with excessive Volt-seconds. The transient auxiliary control and protection unit 512 included in or associated with the controller 504 uses the initial duration $T_{on,max}$ of the ON time pulses applied to the primary side switch devices $Q_1$-$Q_4$ to determine the initial switching period $T_{S2a}$ used in the transient mode. Ideally, the transient auxiliary control and protection unit 512 sets the initial transient mode switching period $T_{S2a}$ equal to twice the duration of the transient mode energy transfer intervals i.e. $T_{S2a}=2*T_{on,max}$ as shown in FIG. 7. In this configuration, there is no dead time between the positive and negative half cycles of the voltage $V_{AB}$ applied to the primary coil P of the transformer 502 during the initial switching period $T_{S2a}$. In a non-ideal setting, the initial transient mode switching period $T_{S2a}$ may be set equal to twice the initial duration $T_{on,max}$ of the transient mode energy transfer intervals plus dead time i.e. $T_{S2a}=2*T_{on,max}+2$ energy circulation intervals to ensure proper operation of the primary side switch devices $Q_1$-$Q_4$. In general, the transient auxiliary control and protection unit 512 ensures the positive half cycle and the negative half cycle of the initial switching period $T_{S2a}$ have the same initial duration $T_{on,max}$.

In each case, there is little to no dead time between the positive and negative half cycles of the transformer primary coil voltage $V_{AB}$ in transient mode as compared to non-transient mode. As a result, a constant or nearly constant voltage is applied across the output inductor $L_O$ of the full-wave rectifier 500 and the inductor ramp current $I_L$ ramps up in a linear or mostly linear manner. A square-wave for the voltage $V_{AB}$ across the primary coil P of the transformer 502 yields a constant ramp of the inductor $i_L$ as represented by the following equations:

$$di_L/dt=(V_{rect}-V_0)/L \quad (1)$$

$$V_{rect}=V_{in}/N \text{ (full-bridge)}, \quad (2)$$

$$V_{rect}=V_{in}/2/N \text{ (half-bridge)} \quad (3)$$

where $V_{rect}$ is the rectified voltage on the secondary side of the full-wave rectifier 500.

The transient auxiliary control and protection unit 512 then symmetrically reduces the duration of the positive half cycle and the negative half cycle for at least one subsequent switching period $T_{S2b}$, $T_{S2c}$, etc. during the transient load condition. The new (reduced) duration of the positive and negative half cycles for at least one subsequent switching period $T_{S2b}$, $T_{S2c}$, etc. can be determined as previously described herein e.g. in connection with FIGS. 3 and 4. For example, the transient auxiliary control and protection unit 512 can reduce the duration of the positive half cycle and the negative half cycle from the maximum initial value $T_{on,max}$ to a minimum assigned value $T_{on,min}$ in a single step as previously described in connection with FIG. 3. In another example, the transient auxiliary control and protection unit 512 can reduce the duration of the positive half cycle and the negative half cycle by a predetermined amount (e.g. 50%) for each subsequent switching period until the duration reaches a minimum duration determined for the positive half cycle and the negative half cycle or until the inductor ramp current $I_L$ reaches a peak current limit $I_{pk\_tfmr}$ determined for the transformer 502.

When the peak current limit $I_{pk}$ is reached or expected to be reached, the transient auxiliary control and protection unit 512 either terminates the present PWM pulse ($P_{last}$ in FIG. 7) or allows the present PWM pulse to complete before halting the PWM sequence as previously described herein. In either case, the PWM sequence remains halted, with the primary side switch devices $Q_1$-$Q_4$ off, and the secondary side rectifying devices $SR_1$-$SR_2$ on or off, until the output current $I_L$ of the full-wave rectifier 500 drops to the new target value $i_{L2}$ after which point the controller 504 resumes primary side switching in the non-transient mode as previously explained herein.

In the transient mode, the inductor current $i_L$ increases linearly or nearly linearly until the peak current value $i_{pk\_Tfmr}$ of the transformer 502 is reached. The transient auxiliary control and protection unit 512 may monitor the inductor current $i_L$ and compare the monitored inductor current to a predetermined threshold to determine when the peak current value $i_{pk\_tfmr}$ of the transformer 502 is reached. The peak current value $i_{pk\_tfmr}$ of the transformer 502 may be determined based on the input voltage $V_{in}$, load step $\Delta I_O$ and output inductor, and is set so that area A and area B in FIG. 7 are ideally equal or nearly equal. Various techniques are well known in the voltage converter arts for measuring output voltage and inductor current, and therefore no further explanation is provided.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein, Therefore, it is intended that this invention be limited only by the claims and the equivalents thereof.

What is claimed is:

1. A method of controlling a non-resonant isolated power converter, the method comprising:
    switching primary side switch devices of the non-resonant isolated power converter at a nominal switching period having a positive half cycle and a negative half cycle to transfer energy across a transformer of the non-resonant isolated power converter during the positive half cycle and the negative half cycle of the nominal switching period, the positive half cycle and the negative half cycle of the nominal switching period having a same nominal duration;
    responsive to a transient load condition, switching the primary side switch devices at an initial switching period different than the nominal switching period to transfer energy across the transformer during a positive half cycle and a negative half cycle of the initial switching period, the positive half cycle and the negative half cycle of the initial switching period having a same initial duration; and
    symmetrically reducing the duration of the positive half cycle and the negative half cycle of the initial switching period for at least one subsequent switching period during the transient load condition.

2. The method of claim 1, wherein the symmetrically reducing the duration of the positive half cycle and the negative half cycle of the initial switching period for the at least one subsequent switching period during the transient load condition comprises:

if a total current delivered by the non-resonant isolated power converter is expected to reach a peak current limit in less than twice the initial duration of the positive half cycle and the negative half cycle of the initial switching period during one of the at least one subsequent switching periods, reducing the duration of the positive half cycle and the negative half cycle of the initial switching period for the one of the at least one subsequent switching periods to a same minimum duration determined for the positive half cycle and the negative half cycle of the initial switching period.

3. The method of claim 2, further comprising:
maintaining the minimum duration of the positive half cycle and the negative half cycle of the initial switching period for each subsequent switching period while the total current delivered by the non-resonant isolated power converter ramps up during the transient load condition.

4. The method of claim 1, wherein the symmetrically reducing the duration of the positive half cycle and the negative half cycle of the initial switching period for the at least one subsequent switching period during the transient load condition comprises:
symmetrically reducing the duration of the positive half cycle and the negative half cycle of the initial switching period by a predetermined amount for each subsequent switching period until the duration reaches a minimum duration determined for the positive half cycle and the negative half cycle of the initial switching period or until a total current delivered by the non-resonant isolated power converter reaches a peak current limit.

5. The method of claim 4, wherein the symmetrically reducing the duration of the positive half cycle and the negative half cycle of the initial switching period by a predetermined amount for each subsequent switching period until the duration reaches a minimum duration determined for the positive half cycle and the negative half cycle of the initial switching period or until the total current delivered by the non-resonant isolated power converter reaches the peak current limit comprises:
symmetrically reducing the duration of the positive half cycle and the negative half cycle of the initial switching period by half for each subsequent switching period until the duration reaches the minimum duration determined for the positive half cycle and the negative half cycle of the initial switching period or until the total current delivered by the non-resonant isolated power converter reaches the peak current limit.

6. The method of claim 4, further comprising:
maintaining the positive half cycle and the negative half cycle of the initial switching period at the minimum duration until the total current delivered by the non-resonant isolated power converter reaches the peak current limit.

7. The method of claim 1, wherein the symmetrically reducing the duration of the positive half cycle and the negative half cycle of the initial switching period for the at least one subsequent switching period during the transient load condition comprises:
comparing a measured voltage parameter of the non-resonant isolated power converter to stored values associated with different switching period durations; and
reducing the duration of the positive half cycle and the negative half cycle of the initial switching period to the switching period duration associated with the stored value that most closely matches the measured voltage parameter.

8. The method of claim 1, further comprising:
terminating the half cycle of the initial switching period which is active when a peak current value of the transformer is reached.

9. The method of claim 1, further comprising:
if a total current delivered by the non-resonant isolated power converter is expected to reach a peak current limit in less than a defined duration during one of the at least one subsequent switching periods, symmetrically allocating the time remaining before the total current is expected to reach the peak current limit to the positive and negative half cycle of the one of the at least one subsequent switching periods.

10. The method of claim 1, wherein the initial duration of the positive half cycle and the negative half cycle of the initial switching period is a function of a magnitude of the transient load condition.

11. The method of claim 1, wherein a different initial duration is assigned to different types of transient load conditions.

12. The method of claim 1, wherein the initial duration of the positive half cycle and the negative half cycle of the initial switching period is selected to avoid saturation of the transformer core.

13. A non-resonant isolated power converter, comprising:
primary side switch devices coupled to secondary side rectifying devices by a transformer; and
a controller operable to:
switch the primary side switch devices at a nominal switching period having a positive half cycle and a negative half cycle to transfer energy across the transformer during the positive half cycle and the negative half cycle of the nominal switching period, the positive half cycle and the negative half cycle of the nominal switching period having a same nominal duration;
responsive to a transient load condition, switch the primary side switch devices at an initial switching period different than the nominal switching period and having a positive half cycle and a negative half cycle to transfer energy across the transformer during the positive half cycle and the negative half cycle of the initial switching period, the positive half cycle and the negative half cycle of the initial switching period having a same initial duration; and
symmetrically reduce the duration of the positive half cycle and the negative half cycle of the initial switching period for at least one subsequent switching period during the transient load condition.

14. The non-resonant isolated power converter of claim 13, wherein the secondary side rectifying devices are configured as a current doubler rectifier having two output inductor windings coupled to the transformer.

15. The non-resonant isolated power converter of claim 13, wherein secondary side rectifying devices are connected in a full-bridge configuration.

16. The non-resonant isolated power converter of claim 13, wherein secondary side rectifying devices are connected in a center-tap configuration.

17. The non-resonant isolated power converter of claim 13, wherein the controller is operable to:
if a total current delivered by the non-resonant isolated power converter is expected to reach a peak current limit in less than twice the initial duration during one of the at least one subsequent switching periods, reduce the duration of the positive half cycle and the negative half cycle of the initial switching period for the one of the at least one subsequent switching periods to a same minimum duration determined for the positive half cycle and the negative half cycle of the initial switching period.

18. The non-resonant isolated power converter of claim 17, wherein the controller is operable to:
maintain the minimum duration of the positive half cycle and the negative half cycle of the initial switching period for each subsequent switching period while the total current delivered by the non-resonant isolated power converter ramps up during the transient load condition.

19. The non-resonant isolated power converter of claim 13, wherein the controller is operable to:
symmetrically reduce the duration of the positive half cycle and the negative half cycle of the initial switching period by a predetermined amount for each subsequent switching period until the duration reaches a minimum duration determined for the positive half cycle and the negative half cycle of the initial switching period or until a total current delivered by the non-resonant isolated power converter reaches a peak current limit.

20. The non-resonant isolated power converter of claim 19, wherein the controller is operable to:
symmetrically reduce the duration of the positive half cycle and the negative half cycle of the initial switching period by half for each subsequent switching period until the duration reaches the minimum duration determined for the positive half cycle and the negative half cycle of the initial switching period or until the total current delivered by the non-resonant isolated power converter reaches the peak current limit.

21. The non-resonant isolated power converter of claim 19, wherein the controller is operable to:
maintain the positive half cycle and the negative half cycle of the initial switching period at the minimum duration until the total current delivered by the non-resonant isolated power converter reaches the peak current limit.

22. The non-resonant isolated power converter of claim 13, wherein the controller is operable to:
compare a measured voltage parameter of the non-resonant isolated power converter to stored values associated with different switching period durations; and
reduce the duration of the positive half cycle and the negative half cycle of the initial switching period to the switching period duration associated with the stored value that most closely matches the measured voltage parameter.

23. The non-resonant isolated power converter of claim 13, wherein the controller is operable to terminate the half cycle of the initial switching period which is active when a peak current value of the transformer is reached.

24. The non-resonant isolated power converter of claim 13, wherein if a total current delivered by the non-resonant isolated power converter is expected to reach a peak current limit in less than a defined duration during one of the at least one subsequent switching periods, the controller is operable to symmetrically allocate the time remaining before the total current is expected to reach the peak current limit to the positive and negative half cycle of the one of the at least one subsequent switching periods.

25. The non-resonant isolated power converter of claim 13, wherein the initial duration of the positive half cycle and the negative half cycle of the initial switching period is a function of a magnitude of the transient load condition.

26. The non-resonant isolated power converter of claim 13, wherein a different initial duration is assigned to different types of transient load conditions.

27. The non-resonant isolated power converter of claim 13, wherein the initial duration of the positive half cycle and the negative half cycle of the initial switching period is selected to avoid saturation of the transformer core.

* * * * *